May 28, 1968
J. E. HALVERSON
3,385,335
EGG SEPARATOR
Filed March 28, 1966
2 Sheets-Sheet 1
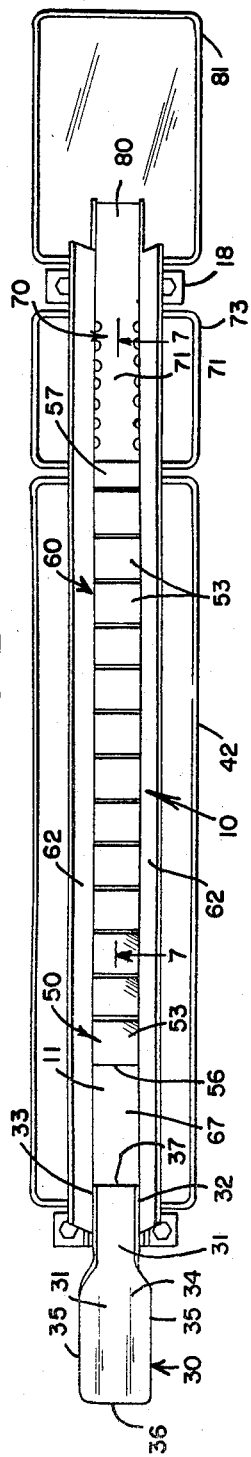
INVENTOR.
JAMES E. HALVERSON
BY
Caswell Lagaard & Wicks
ATTORNEYS

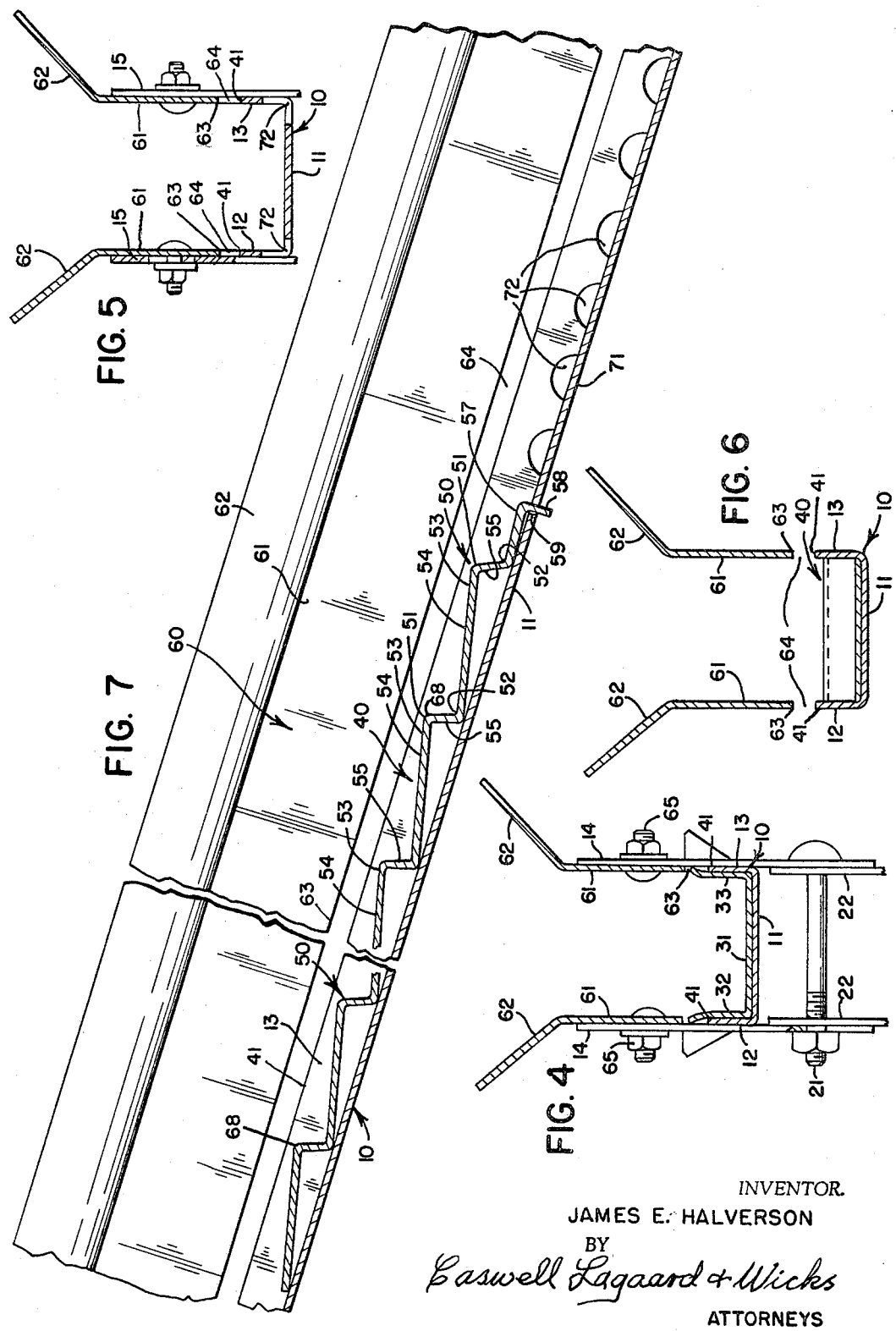

3,385,335
EGG SEPARATOR
James E. Halverson, Box 55, Dallas, Wis. 54733
Filed Mar. 28, 1966, Ser. No. 537,864
10 Claims. (Cl. 146—2)

ABSTRACT OF THE DISCLOSURE

An egg separating device for the separation of the yoke of an egg from the albumen and for the separation of the thick albumen from the thin albumen, having an inclined trough along which the yolk and albumen of a disparted egg may pass, feed means for feeding the disparted egg to the trough, decanting means extending along the trough, a jogging device extending along the bottom of the trough for dislodging the thick algumen from the yolk sack, means for preventing decanting of the yolk, draining means at the lower end of the trough for removing the thin albumen from the trough and discharge means for discharging the yolks from the trough.

---

The herein disclosed invention relates to an egg separator and has for an object to provide a construction by means of which the yolk can be separated from the albumen of a disparted egg and the thick albumen separated from the thin albumen.

Another object of the invention resides in providing a separator in which the matter to be separated is handled in such a way as to not break the yolk and still effectively remove the albumen from the yolk.

Another object of the invention is to provide a separator by means of which large yolks and also the yolks of pullet eggs can be readily separated from the albumen and the yolks prevented from passing with the thick albumen into the receptacle for the thick albumen.

An object of the invention resides in providing a jogging device for jogging the matter to be separated so as to dislodge the albumen from the yolk of the eggs.

Another object of the invention resides in removing the thick albumen by decanting means.

Other objects of the invention reside in the novel combination and arrangement of parts and in the details of construction hereinafter illustrated and/or described.

In the drawings:

FIG. 1 is a side elevational view of the egg separator illustrating an embodiment of the invention.

FIG. 2 is a plan view of the structure shown in FIG. 1.

FIG. 3 is a perspective view of a portion of the jogging device drawn to a greater scale than FIG. 1.

FIG. 4 is a cross sectional view taken on the line 4—4 of FIG. 1 and drawn to a greater scale than FIG. 1

FIG. 5 is a cross sectional view similar to FIG. 4 and on the line 5—5 of FIG. 1.

FIG. 6 is a cross sectional view taken on line 6—6 of FIG. 1 and drawn to the same scale as FIG. 4.

FIG. 7 is a fragmentary longitudinal elevational sectional view taken on line 7—7 of FIGURE 2 and drawn to the same scale as FIG. 4.

The invention consists of a trough 10 U-shaped in form which is arranged on an incline and which has a bottom 11 and sides 12 and 13. Attached to the sides 12 and 13 at the ends thereof are plates 14 and 15 which project both above and below the walls 11 and 12. The plates 15 are pivoted to standards 16 by means of bolts 17 passing through said standards and adapted to be received in open ended slots 19 in said plates whereby the said trough may swing in an up-and-down direction and be readily removable from said standards. The standards 16 have flanges 18 extending outwardly therefrom and which serve as feet for supporting one end of the trough. In a similar manner, the plates 14 are supported by means of bolts 21 to links 22. These links are formed at their lower ends with slots 23. Bolts 24 extend through these slots and through washers 25 and through standards 26 and serve to guide the upper end of the trough 10 for swinging movement in an up-and-down direction about the bolts 17 as an axis. By means of this construction, the inclination of the trough 10 can be adjusted at will.

For introducing eggs into the separator, an inlet 30 is employed which is U-shaped in form having a bottom 31 and sides 32 and 33, and sides 32 and 33 being set, within the sides 12 and 13 of the trough 10 and the bottom 31 resting upon the bottom 11 thereof. The inlet 30 extends exteriorally of the trough 10 as indicated at 34. At such location the sides 32 and 33 are flared outwardly to form diverging flanges 35 which together with the bottom 34 constitute a hopper 36 on which the matter within the egg may be deposited. The inlet 30 may be welded or removably mounted in the trough 10 by any suitably construction not shown in the drawings.

For removing the thick albumen from the egg yolks a decanting means 40 is provided which utilizes the trough 10 and particularly both the sides 11 and 12 of the same. The upper edges 41 of the said sides serve as decanting edges and engage the matter to be separated and draw off the heavy albumen from the yolk and lead it over the sides 11 and 12. The albumen so drawn off falls below trough 10 and is received in a receptacle 42 disposed below said trough and at a locality following the inlet 30.

To assist in dislodging the thick albumen from the yolk a jogging device 50 is employed. This device is constructed from a strip of sheet metal such as shown in FIGS. 3 and 7. The sheet is formed with alternate bends 51 and 52 extending transversely thereof and which form in the strip steps 53 which have threads 54 and rises 55 with curved corners 68 therebetween located about $\frac{1}{16}$ of an inch below the decanting edges 41. The jogging device 50 is received in the trough 10 and fits between the sides 12 and 13 of the same. The said jogging device is so positioned that the upper end 56 of the same lies somewhat below the edge 37 of the inlet 30 shown in FIG. 2, thus leaving a portion of the bottom 11 of said trough 10 exposed. The lower end of the said jogging device has a portion 57 which lies flat upon the bottom 11 and which terminates in a downwardly extending tongue 58. This tongue is adapted to enter a slot or cavity 59 in the bottom 11 and prevents the jogging device from sliding along said bottom. By means of this construction, the jogging device can be removed from the trough 10 for the purpose of cleaning.

To prevent the egg yolks from passing over the decanting edges 41 two guards 60 are employed each of which has a vertical wall 61 and a flange 62 extending angularly outwardly therefrom. The wall 61 has a lower edge 63 which lies above the decanting edge 41 and form a passageway 64 through which the thick albumen of the egg may pass. This passageway can be made small enough so that the egg yolks cannot flow through with the albumen. A $\frac{3}{16}$ inch spacing of the edge 63 from the decanting edge 41 has been found satisfactory for most eggs. The guards 60 are attached to the plates 14 and 15 by means of bolts 65 which extend through slots 66 in the plates 14 and 15 and support the said guards for adjustment to vary the width of the passageway 64.

The thin albumen is removed from the separator by secondary separating and draining means 70 which utilizes the lower end of the trough 10 indicated by the reference numeral 71. This end has formed in a number of drain openings 72 which are stamped in it the metal before the same is bent and which are partly in the bottom 11 and partly in the sides 12 and 13. The thin albumen passes through these openings and is discharged into a receptacle 73 immediately below the end 71 of the trough 10. The egg yolks being somewhat in the form of a ball do not engage the portion of the trough in which the openings 72 are situated and are hence not injured by the irregular metal edges adjacent said openings.

The lower end 80 of the trough 10 extends beyond the guards 60 and serves as a discharge means for the egg yolks. This discharge means discharges into a receptacle 81 immediately below said discharge means.

The method of operation is as follows:

The eggs may be disparted in any suitable manner not forming a feature of the instant invention and are deposited upon the hopper 36 of inlet 30. The trough 10 being arranged on an incline causes the eggs to slide off from the inlet 30 and onto the portion 67 of the bottom 11 of the trough 10 and from there onto the first step 53 of the jogging device 50. The treads 54 of the jogging device being arranged on a slight incline, the motion of the egg is retarded and the egg travels from one step to the other being jogged at each riser upon dropping to the following tread. In this manner the thick albumen is dislodged from the yolk sack and is separated from the yolk by passing over the decanting edges 41 and through the passageway 64 into the receptacle 42. When the remaining portion of the egg reaches the end 71 of the trough 10, the yolk continues to slide on the bottom 11 of the said trough 10 while the thin albumen passes out through the openings 72 in the sides 12 and 13 and the bottom 11 of the trough 10. Upon further passage the separated yolks slide down the discharge means 80 and into the receptacle 81. For different condition of the eggs and the separation of the eggs of different sizes adjustment of the trough 10 can be made by sliding the links 22 relative to the standards 26 and by raising and lowering the guards 61 with respect to the plates 14 and 15 to vary the height of the openings 64.

The advantages are manifest. The device is simple in construction and can be fabricated from readily available sheet material. The jogging device is removable from the trough, and removably from the standard so all of the parts can be readily cleaned. The separator will handle pullet eggs as well as regular hen eggs and by properly adjusting the guards, the yolks can be prevented from passing over the decanting edges with the thick albumen.

Changes in the specific form of the invention, as herein described may be made within the scope of what is claimed without departing from the spirit of the invention.

Having described the invention, what is claimed as new and desired to be protected by Letters Patent is:

1. An egg separator comprising:
   (a) an elongated inclined trough along which a disparted egg may travel, said trough comprising:
   (b) an elongated bottom,
   (c) spaced sides extending upwardly therefrom,
   (d) feed means for directing the disparted eggs into the upper end of the trough,
   (e) decanting means formed by the upper edges of said sides and extending along the trough for decanting albumen from the yolks of the eggs,
   (f) a jogging device extending along the bottom of the trough for dislodging the albumen from the yolk sack,
   (g) albumen receiving means below the trough, and
   (h) discharge means for discharging the yolks from the trough.

2. An egg separator according to claim 1, in which:
   (a) the decanting means includes elongated guards extending above the upper edges of the trough sides and prevents decanting of the yolks.

3. An egg separator according to claim 2 in which:
   (a) the guards are adjustable toward and from the upper edges of the trough sides to vary the opening between the upper edges of the trough sides and the lowermost portions of the guards.

4. An egg separator according to claim 3 in which:
   (a) the guards have inwardly facing surfaces corresponding with the inner surfaces of the trough sides and lower edges disposed above the upper edges of said trough sides.

5. An egg separator according to claim 1 in which:
   (a) the jogging means includes a corrugated plate having treads and risers and in which
   (b) both the treads and the risers slope toward the discharge end of the trough.

6. An egg separator according to claim 5 in which:
   (a) the corrugated plate is detachably mounted in the bottom of the trough.

7. An egg separator according to claim 6 in which:
   (a) the corrugated plate has a portion resting on the trough and
   (b) a tongue depending therefrom and received in
   (c) a cavity formed in the bottom of the trough.

8. An egg separator comprising:
   (a) an elongated inclined trough along which a disparted egg may travel, said trough comprising:
   (b) an elongated bottom,
   (c) spaced sides extending upwardly therefrom,
   (d) feed means for directing the disparted eggs into the upper end of the trough,
   (e) discharge means at the lower end of the trough for directing the yolks from the trough,
   (f) decanting means extending along the sides of the trough for decanting albumen from the yolks of the eggs,
   (g) a jogging device extending along the trough and dislodging the albumen from the yolks of the eggs,
   (h) said jogging device terminating short of the discharge end of the trough, and
   (i) a secondary separating and draining means between the jogging device and discharge means for separately removing from the yolks the albumen not decanted.

9. An egg separator according to claim 8 in which:
   (a) the secondary separating and draining means includes the bottom and sides of the trough and,
   (b) discharge openings formed in the trough in the sides thereof and at the locality of the bottom.

10. An egg separator according to claim 9 in which:
    (a) the openings extend through both the sides and bottom of the trough.

References Cited
UNITED STATES PATENTS

| | | | |
|---|---|---|---|
| 1,896,498 | 2/1933 | Taniguchi | 146—2 |
| 2,488,473 | 11/1949 | Lane et al. | 146—2 |

W. GRAYDON ABERCROMBIE, *Primary Examiner.*